Dec. 9, 1958    W. M. DUNCAN    2,863,706
BEARING
Filed Jan. 18, 1957

INVENTOR:
WILLIAM M. DUNCAN
By Brunings and Sutherland
ATTORNEYS

United States Patent Office 2,863,706
Patented Dec. 9, 1958

2,863,706

BEARING

William M. Duncan, Alton, Ill.

Application January 18, 1957, Serial No. 635,033

3 Claims. (Cl. 308—72)

This invention relates to bearings, and more particularly to a bearing unit wherein the bearing is adapted for self-alignment with a shaft.

It will be understood that the alignment of bearing is a task requiring precise time-consuming and costly machining operations. Accordingly, one of the objects of the invention is to provide for quick, inexpensive alignment of bearings. Among the more specific objects of the invention may be noted the provision of a bearing unit adapted for attachment to a supporting structure over a shaft without the necessity of carefully machining the supporting structure in order to align the bearing; the provision of a bearing unit of this type which is inexpensive and simple in construction; and the provision of a bearing unit wherein the bearing per se is movable in all directions in order to align with a shaft yet which is readily lubricated.

Briefly, the bearing unit herein comprises a hollow housing, which may have flange means for attachment to the supporting structure. The bearing itself, which may be a sleeve, is fixed within a block of outer dimensions less than the interior dimensions of the housing, so that the box is freely movable within the housing, at least to some extent. The block is formed with a ball-seat at its bottom for partially receiving a supporting ball, and the housing is grooved therebeneath so as also to receive the supporting ball. It will be understood the ball recess in the block and groove in the housing are of such size in relation to the diameter of the ball that the block is supported in spaced relationship from all interior walls of the housing. As such, the block is movable in any direction. When the unit is slipped over the end of a shaft and the housing secured against the supporting structure, the bearing held by the block may adjust to any angle, vertical or horizontal, or may move endwise or laterally. Accordingly, such bearings align automatically when attached to supporting structures over a shaft.

More specifically, the ball-receiving groove may extend to a removable back cover, in order to facilitate assembly. Also, a lubricating port may be formed in the block and a somewhat larger hole formed in the housing opposite the port. With this arrangement, a pressure lubricating fitting may be readily inserted through the housing and secured to the block.

Figure 1:
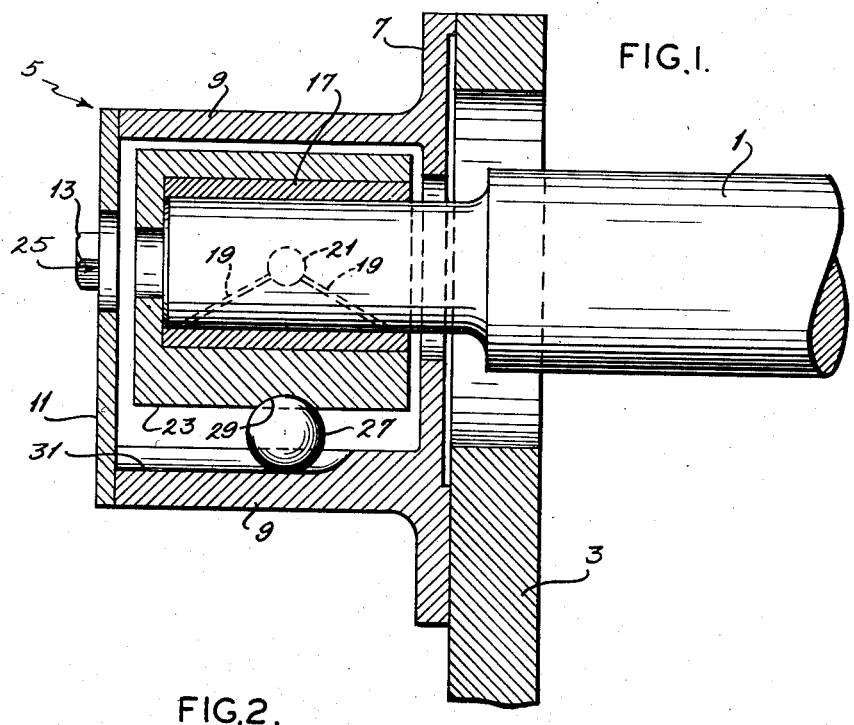
Figure 2:
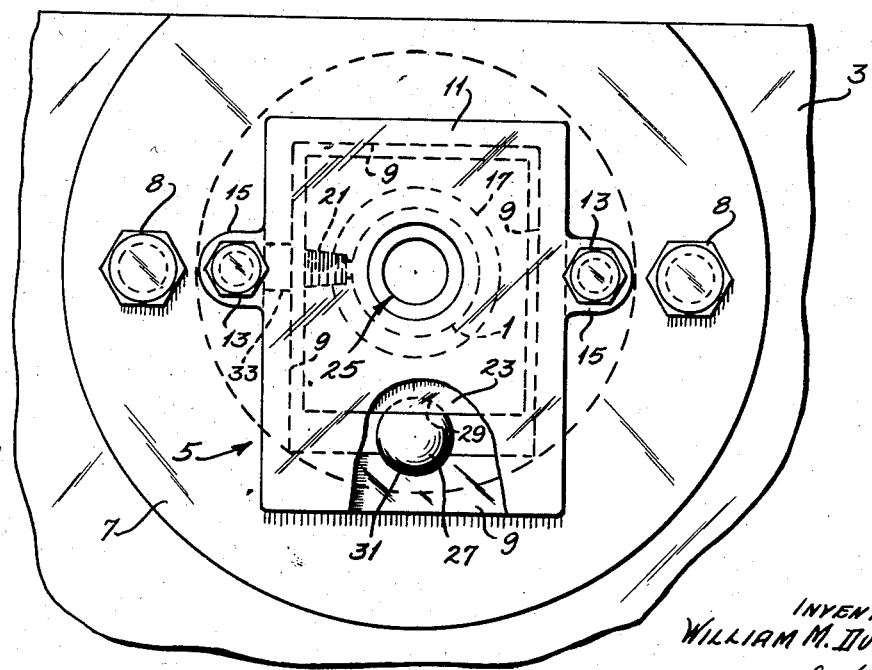

Other features of the invention will be in part apparent from and in part pointed out in the following detailed description taken in connection with the accompanying drawings, in which:

Fig. 1 is a longitudinal section illustrating the bearing unit of this invention; and Fig. 2 is a left end elevation of the unit shown in Fig. 1.

Referring to the drawings, there is shown a horizontal shaft 1, which is to be journalled for rotation on a vertical supporting structure 3. In the illustrated embodiment, the shaft extends through the supporting structure so that a bearing unit may be secured over the shaft against the outer surface of structure 3, although other arrangements are possible. The present invention contemplates that a bearing unit, generally designated 5, will have an outer housing including a flange portion 7, which is adapted to be secured against supporting structure 3 as by bolts 8. Enclosing side walls 9 extend from the flange portion 7, thereby to form a bearing chamber. The side walls 9 may be arranged as a rectangular box opening toward the back end, and a plate or cap 11 is removably secured over the back end by bolts 13, which are secured in the ears (not shown) on the side walls 9 and extend through ears 15 projecting from the plate 11.

The shaft itself is rotatably received within a cylindric sleeve 17 of bearing material, which sleeve may be grooved at 19 and provided with a threaded port 21, through which lubricant is force-fed. The sleeve is fixed within a block 23 of shape and size such as to be loosely contained within the housing. In the illustrated embodiment, the block has rectangular sides generally parallel with but in spaced relationship from the inner sides of the housing. Also, the end portions of the block terminate short of the ends of the housing, although the front flanged portion 7 of the housing partially overlaps the block and the removable plate 11 locks the block within the housing. Both the plate 11 and block 23 may be bored, as indicated at 25, if desired.

In order to provide for multi-directional movement of the block, it is supported upon a ball 27, the bottom portion of the block being formed with a concave recess or seat 29 partially receiving the upper portion of the ball. A groove 31 of concave cross section is formed in the lower side of the housing opposite seat 29, so as partially to receive the lower portion of the ball. It will be noted that the groove 31 extends rearwardly to the removable back plate 11, thereby facilitating assembly of the block within the housing on the supporting ball. As such, the ball provides a rocking support, which permits the block 23 to move laterally, endwise or at any angle.

From the above, it will be seen that the bearing unit herein disclosed may be slipped over the projecting shaft so that the shaft is received within the bearing sleeve 17, and the flanged portions of the housing is otherwise secured to a supporting structure. In view of the multi-directional movement, which the block has with respect to the housing, the housing need not be precisely positioned upon the supporting structure. In other words, the bearing sleeve 17 and block 23 may move to whatever position is dictated by the shaft, within the tolerances or limits of normal practice. Lubrication of the sleeve is accomplished by attachment of a lubricating fitting (not shown) to the port 21, an elongate or larger opening 33 being formed in one side of the housing opposite the port 21 so as to admit the fitting.

It will be understood that the invention contemplates two such bearing units would be used at opposite ends of the shaft, but the invention should not be understood as limited to the particular illustrated embodiment. For example, the housing may be exteriorly cylindric in shape and press fitted within a bore in the supporting structure. Also, the unit might be designed so as to permit the shaft to project from both ends thereof. Other modifications and variations will readily suggest themselves to those skilled in the art without departing from the spirit of the invention or the scope thereof, as set forth in the appended claims.

Having thus described the invention, what is claimed and desired to be secured by Letters Patent is:

1. A bearing unit of the character described comprising a hollow housing, a block loosely contained within said housing, said block having interior bearing means for journalling a shaft, a ball partially seated in the lower portion of said block, and an elongate slot formed in the bottom of the housing for also seating said ball, said slot extending to one side of the housing, means permitting insertion at said end of said slot, and said ball being of such size in relation to its respective seats that the block is spaced from the interior top and bottom walls of the housing.

2. A bearing unit as set forth in claim 1, wherein the housing includes a removable closure cap at one end thereof, said ball-receiving slot in the housing extending to said end in order to permit assembly of the block on the ball within the housing.

3. The bearing unit set forth in claim 2, wherein said housing includes means for attachment thereof to a supporting structure.

References Cited in the file of this patent

UNITED STATES PATENTS

| | | |
|---|---|---|
| 1,057,402 | Berg | Apr. 1, 1913 |
| 2,258,834 | Willi | Oct. 14, 1941 |

FOREIGN PATENTS

| | | |
|---|---|---|
| 595,318 | France | June 13, 1925 |
| 442,528 | Germany | Mar. 31, 1927 |